(12) United States Patent
Hessmert et al.

(10) Patent No.: US 6,587,774 B2
(45) Date of Patent: Jul. 1, 2003

(54) METHOD AND SYSTEM FOR OPERATING A BRAKE SYSTEM OF A MOTOR VEHICLE HAVING TRACTION CONTROL

(75) Inventors: Ulrich Hessmert, Schwieberdingen (DE); Jost Brachert, Ditzingen (DE); Thomas Sauter, Remseck (DE); Helmut Wandel, Markgroeningen (DE); Norbert Polzin, Zaberfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/753,376

(22) Filed: Jan. 2, 2001

(65) Prior Publication Data

US 2001/0020210 A1 Sep. 6, 2001

(30) Foreign Application Priority Data

Dec. 30, 1999 (DE) .......................................... 199 63 763

(51) Int. Cl.$^7$ ............................................. B60K 17/348
(52) U.S. Cl. ........................ 701/83; 701/70; 180/244; 303/9.71; 303/11; 303/122.01; 303/133; 303/135; 303/167
(58) Field of Search ............................ 701/83, 110, 70, 701/71, 78, 92, 82, 84, 89; 303/166, 155, 113.4, 20, 156, 9.71, 11, 122.01, 122.03, 122.09, 133, 152, 157, 167; 180/244, 275

(56) References Cited

U.S. PATENT DOCUMENTS

| | | | | |
|---|---|---|---|---|
| 5,738,420 A | * | 4/1998 | Kawaguchi et al. | 303/146 |
| 5,826,952 A | * | 10/1998 | Feigel et al. | 303/119.2 |
| 5,850,616 A | * | 12/1998 | Matsuno et al. | 701/82 |
| 5,984,434 A | * | 11/1999 | Aizawa | 303/174 |
| 6,002,248 A | | 12/1999 | Binder | 324/160 |
| 6,026,343 A | * | 2/2000 | Ogino | 701/72 |
| 6,076,900 A | * | 6/2000 | Jung et al. | 303/156 |
| 6,089,677 A | * | 7/2000 | Fukumura et al. | 303/112 |
| 6,157,887 A | * | 12/2000 | Zittlau | 701/70 |
| 6,196,643 B1 | * | 3/2001 | Yokoyama et al. | 303/166 |
| 6,213,567 B1 | * | 4/2001 | Zittlau et al. | 303/20 |
| 6,254,203 B1 | * | 7/2001 | Arnold | 303/177 |
| 6,293,140 B1 | | 9/2001 | Lohberg | 73/146 |

FOREIGN PATENT DOCUMENTS

| | | |
|---|---|---|
| DE | 196 12 825 | 10/1997 |
| DE | 196 20 581 | 11/1997 |

OTHER PUBLICATIONS

Von Jörg Stöcker et al., "Der Intelligente Reifen—Zwischenergebnisse einer interdisziplinären Forschungskooperation", ATZ Automobiltechnische Zeitschrift 97 (1995) 12*** Concise explanation of the relevance of this article is provided in the Specification as per 37 CFR 1.98(a)(3)(i).

* cited by examiner

Primary Examiner—Thomas G. Black
Assistant Examiner—Tuan C To
(74) Attorney, Agent, or Firm—Kenyon & Kenyon

(57) ABSTRACT

A method and a system for operating a brake system of a motor vehicle having traction control are described. The brake system contains sensors which are assigned to the individual vehicle wheels and with which a quantity representing at least the driving and/or braking forces acting between the road surface and the vehicle wheel is detected for the respective vehicle wheel. For operation of the brake system having traction control, pressure quantities which describe the brake pressure established for the respective vehicle wheel are analyzed. The pressure quantities are determined as a function of the quantities detected by the sensors.

16 Claims, 4 Drawing Sheets

METHOD AND SYSTEM FOR OPERATING A BRAKE SYSTEM OF A MOTOR VEHICLE HAVING TRACTION CONTROL

FIELD OF THE INVENTION

The present invention relates to a method and a system for operating a brake system of a motor vehicle having traction control. The term "operation" here refers to both open- and closed-loop control.

BACKGROUND INFORMATION

In operating brake systems in motor vehicles, it is important to determine exactly the actual brake pressure that occurs in a vehicle. In particular, the brake pressure on the vehicle wheels is determined in order to operate the brake systems of vehicles, e.g., for ABS, ASR or ESP control systems.

It is known that the brake pressure and braking torque are determined by calculating the brake pressure from states between the road surface and the wheels on the vehicle as derived from wheel speed signals. For a long time, the forces acting between the wheel and road surface could not be determined directly for lack of suitable sensors. Instead, the signals required for control purposes were derived or calculated from wheel speed signals.

Meanwhile, sensors have become available to permit direct determination of the state prevailing between the road surface and the vehicle wheels.

For example, it is known from the article by Jörg Stöcker et al. "Der 'Intelligent Reifen'—Zwischenergebnisse einer interdisziplinären Forschungskooperation" ("The 'Intelligent Tire'—Interim Results of an Interdisciplinary Research Cooperation") in the automotive engineering journal *ATZ Automobiltechnische Zeitschrift*, vol. 97 (1995) no. 12, pp. 824–832 that a tire can be equipped with an integrated force sensor which makes it possible to detect forces acting on the tire in three directions, namely the longitudinal or X direction, the transverse or Y direction and the vertical or Z direction. The signals derived from the forces detected in this way can be sent to an analyzer unit where the signals are analyzed appropriately.

Another device for determining the rotational behavior of a vehicle wheel is described in German Published Patent Application No. 196 20 581, for example, which describes a device for determining the rotational behavior of a vehicle wheel, where magnetizing surfaces having alternating polarities are arranged uniformly in the circumferential direction of the wheel. The surfaces are incorporated into or applied to the tire wall. A measuring sensor has two or more measuring elements arranged at different radial distances from the axis of rotation, so that there is a change in phase angle between the signals delivered by the measuring elements in the case of deformation of a tire due to the forces acting on the tire or due to the driving torque or brake torque transmitted. The change in phase angle can then be analyzed as a measure of the torques transmitted from the wheel or tire to the road surface and/or the instantaneous coefficient of friction.

German Published Patent Application No. 196 12 825 describes a roller bearing or a wheel bearing which is designed to detect driving forces and/or braking forces.

With the method and/or the system according to the present invention, it is possible to use a sensor designed according to the principle described in the ATZ article mentioned above or to use a sensor based on the principle described in German Published Patent Application No. 196 12 825.

Although tire sensors have often been described in the related art as useful for controlling the driving behavior of motor vehicles, it has not previously been known that a brake system of a vehicle can be improved by using signals from sensors that measure the forces acting between the vehicle wheel and the road surface with a view to determining the brake pressure prevailing on each of the vehicle wheels.

Therefore, the object of the present invention is to create a method and a system with which the operation of a brake system of a vehicle having traction control can be simplified and improved.

In particular, the method according to the present invention and the respective system permit a simple determination of the precise brake pressure actually occurring in each vehicle. The pressure sensors that determine the brake pressure in a brake system, in particular in electrohydraulic brakes, are no longer necessary here, thus eliminating the need for complicated assembly, adjustment, monitoring and plausibility checks as required with the previous pressure sensors and eliminating the costs of the relatively expensive pressure sensors. This also eliminates the complicated A/D conversion required with the previous pressure sensors.

The pressure quantities determined for a vehicle wheel can be sent to a control unit and processed further in algorithms of ABS, ASR or ESP control systems. Since the pressure quantities determined describe the actual brake pressures occurring, the control can be improved significantly.

For example, the following parts in the ASR algorithm can be improved greatly: holding times in pressure buildup can be lengthened, because a pressure buildup can be initiated immediately when the precise brake pressure is known, and holding times in pressure reduction can be lengthened, because a blocking torque can be reduced accurately in defined stages when the precise brake pressure is known and thus better traction can be achieved without the wheel running up to the reference speed or running into brake slip. This method can be used with $\mu$-split braking, for example. Gradient switching in a pressure buildup or reduction can be improved because through exact determination of the braking torque, it is possible to ensure that the switching induces the predefined effect with respect to wheel response.

Complicated hydraulic models which were used previously for determining the most accurate possible value for the actual brake pressure are also unnecessary. Faults occurring in the hydraulic system such as hydraulic leakage or jamming of a valve can be detected easily. Effects of these faults, which might be noticed by the driver of the vehicle in a negative manner, can be prevented easily by compensatory regulation.

SUMMARY OF THE INVENTION

In the method according to the present invention, a quantity for the respective vehicle wheel is detected using sensors assigned to the individual vehicle wheels, so that the quantity represents at least the driving forces and/or braking forces acting between the road surface and the vehicle wheel. In particular, pressure quantities describing the brake pressure for the respective vehicle wheel are determined as a function of the quantities detected with the sensors. The pressure quantities thus determined are then analyzed for operation of the brake system having traction control.

The quantities detected by the sensors advantageously result from the motion and/or rotation of the vehicle wheel, these quantities being output by the sensors as phase-modulated or amplitude-modulated signals.

In an analyzer unit, a quantity that describes the circumferential force of the respective vehicle wheel is determined from the quantities detected by the sensors and is then used to determine the brake pressure.

The sensors are provided on each vehicle wheel in particular, so that a pressure quantity is determined for each individual vehicle wheel, and these pressure quantities are sent to a control unit for regulating the brake pressure according to the pressure quantities thus determined.

The quantity describing the circumferential force of the respective wheel is advantageously determined using a characteristic curve stored in the analyzer unit as a function of the respective phase- or amplitude-modulated signal. The brake pressure can be determined from the circumferential force by multiplying it by a predetermined factor.

The use of a characteristic curve is explained in greater detail below.

Driving and/or braking forces act on the tires, causing them to be deformed. This deformation causes a displacement of the magnetic particles incorporated into the tires. This displacement results in modulation of the phase and/or amplitude of the signal delivered by the sensor. The intensity with which the amplitude and/or phase is modulated is a measure of the driving and/or braking forces acting on the tire. Consequently, the circumferential force Fu can be determined from this signal by using a characteristic curve stored in the analyzer unit. As an alternative to this, it is also conceivable to determine the circumferential torque. If we then consider the case of braking, then the tension force on the brake shoe that is to be applied to achieve the circumferential force can be determined by using the equation Fm=Fu/C*, where C* is a brake characteristic stored in the analyzer unit. The braking torque achieved in braking is obtained from the equation MB=Fm·r, i.e., the braking torque is the product of the frictional forces induced by the tension force multiplied by the distance of the points of application of these forces from the axis of rotation of the wheel. The brake pressure to be established for the respective wheel is obtained from the equation PB=MB·C**.

Taking into account the preceding equations, the following equation is thus obtained for determining the brake pressure:

$$PB = Fu \cdot r \cdot C^{**}/C^{*} = Fu \cdot Cp.$$

In summary, this means that the quantity describing the circumferential force of the respective wheel is obtained by using a characteristic curve stored in the analyzer unit as a function of the phase- or amplitude-modulated signals, i.e., as a function of the deformation occurring on the tire. The brake pressure is determined from the circumferential force by multiplying it by a predetermined factor Cp.

In addition, the signals for a respective brake pressure are sent as actual values directly to the control unit for a brake, in particular an electrohydraulic brake.

The signals for a respective brake pressure for each individual vehicle wheel which are sent as actual values are processed further in the control unit in an algorithm for controlling the brake.

The signals for a prevailing brake pressure for each individual vehicle wheel which are processed further in an algorithm for controlling the brake are sent as control signals to valve controls for brakes for each individual vehicle wheel.

The newly determined signals for the prevailing brake pressure and/or a pressure quantity for each individual vehicle wheel is subjected to PT1 filtering after being entered into the control unit. A check is performed to determine whether a predetermined rate of pressure change, representing the maximum allowed pressure difference of two pressure quantities determined at successive times is exceeded and whether the signals are within predetermined pressure limits. On fulfilling the conditions, the newly detected signal is sent as an actual value to the valve control. New pressure quantities are determined for each individual vehicle wheel only after a predetermined period of time.

During a pressure holding phase of the valve control, the signals for a prevailing brake pressure or pressure quantities for each individual vehicle wheel which are determined as actual values are advantageously compared with setpoint values for the brake pressure. Then if the deviation is greater than a predetermined value, the conclusion is drawn that there is a hydraulic leak or a jammed valve. When a hydraulic leak is detected on a certain valve, a pressure buildup is initiated immediately in the algorithm part of the control unit and the valve control. In the case of jamming of a valve, a pressure reduction is initiated immediately.

In the system according to the present invention for carrying out the method according to the present invention, the control unit has in particular a processing unit which subjects signals to a PT1 filtering after they are entered and then determines whether a predetermined rate of pressure change, representing the maximum allowed pressure difference between two pressure quantities determined at successive times, is exceeded and whether those pressure quantities are within predetermined pressure limits. On fulfilling the conditions, the processing unit sends the pressure quantities thus determined as actual values to the valve control. The processing unit preferably has a timer for defining a predetermined period of time after which it repeats a determination of the actual values.

In addition, during a pressure holding phase of the valve control, the processing unit compares the pressure quantities determined as actual values for a prevailing brake pressure for each individual vehicle wheel with setpoint values for the brake pressure, and if the deviation is greater than a predetermined value, it draws the conclusion that there is a hydraulic leak or jamming of a valve.

The control unit and the valve control immediately initiate a pressure buildup in the event a hydraulic leak is detected, and they immediately initiate a pressure reduction in the event a jammed valve is detected.

DETAILED DESCRIPTION

Figure 1:
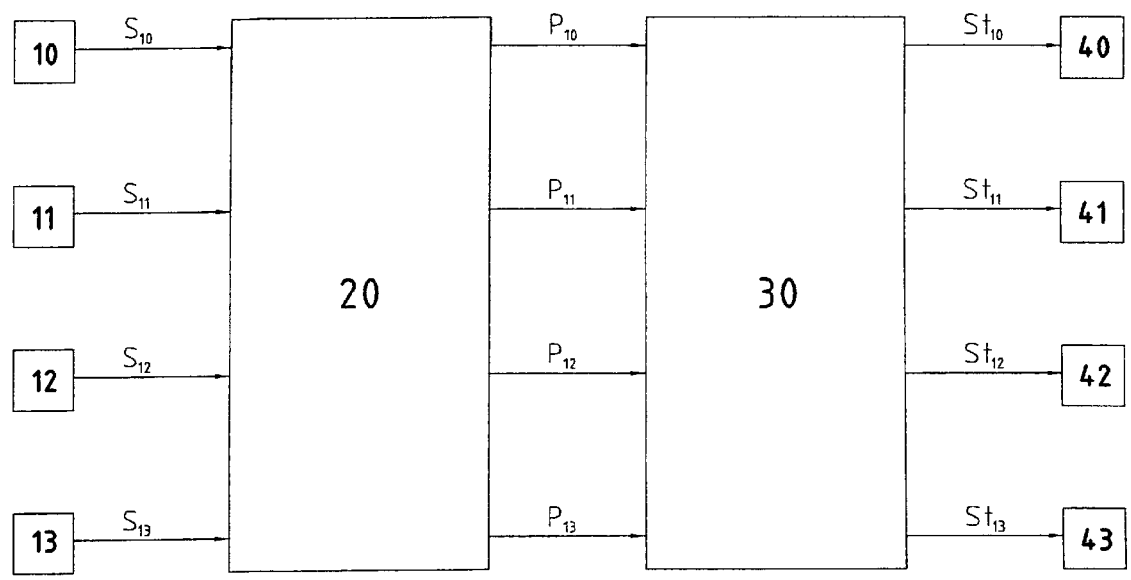
FIG. 1 shows a block diagram of a system for controlling the brake systems of motor vehicles.

FIG. 1 shows a block diagram of a system for carrying out the method according to the present invention. The system is composed of sensors 10, 11, 12 and 13 for the respective vehicle wheels, an analyzer unit 20, a control unit 30 and valve controls 40, 41, 42 and 43 for the respective vehicle wheels. Sensors 10, 11, 12 and 13 are sensors with which the forces acting between the vehicle wheel and the road surface can be measured. Tire sensors such as those described in German Published Patent Application No. 196 20 581 are preferred here. Signals $S_{10}$, $S_{11}$, $S_{12}$ and $S_{13}$ from sensors 10, 11, 12 and 13, respectively, are sent to analyzer unit 20, which analyzes signals $S_{10}$, $S_{11}$, $S_{12}$ and $S_{13}$ so that the braking torque and in particular the brake pressure on each vehicle wheel are represented as signals. Signals $P_{10}$, $P_{11}$, $P_{12}$ and $P_{13}$ for the brake pressure on each vehicle wheel are sent to control unit 30 for further processing. In the present case, further processing results in signals $St_{10}$, $St_{11}$, $St_{12}$ and $St_{13}$ for controlling the respective (brake) valve controls 40, 41, 42 and 43 for each vehicle wheel.

If tire sensors such as those described in German Published Patent Application No. 196 20 581 are used as sensors 10, 11, 12 and 13, magnetizing surfaces are incorporated into each tire as measuring transducers, resulting in a phase- and amplitude-modulated signal by way of analyzer unit 20 with each revolution or movement of a wheel. The circumferential force of each tire is determined by measuring the deformation of the respective tire in the tangential direction. This determination can be made in particular on the basis of a stored characteristic curve between deformation and circumferential force, as already described in detail above. The quantity describing the circumferential force of the respective wheel is consequently determined using a characteristic curve stored in the analyzer unit as a function of the phase- or amplitude-modulated signals, i.e., as a function of the deformation of the tire. The brake pressure is determined from the circumferential force by multiplying it by a predetermined factor Cp.

A control takes place in control unit 30, where the hydraulic models which were used in the past and which are relatively complicated and operate with pressure estimates are replaced by sending the signals or pressure quantities $P_{10}$, $P_{11}$, $P_{12}$ and $P_{13}$ representing the exact brake pressure to control unit 30, where they and are processed. In each computation cycle, the setpoint pressure request of a controller and the actual pressure are compared in control unit 30 according to respective signals $P_{10}$, $P_{11}$, $P_{12}$ and $P_{13}$. The difference between setpoint values P_SOLL and actual values P_IST yield control signals $St_{10}$, $St_{11}$, $St_{12}$ and $St_{13}$ which are output by control unit 30 for (brake) valves of the vehicle wheels in a simple manner.

Figure 2:
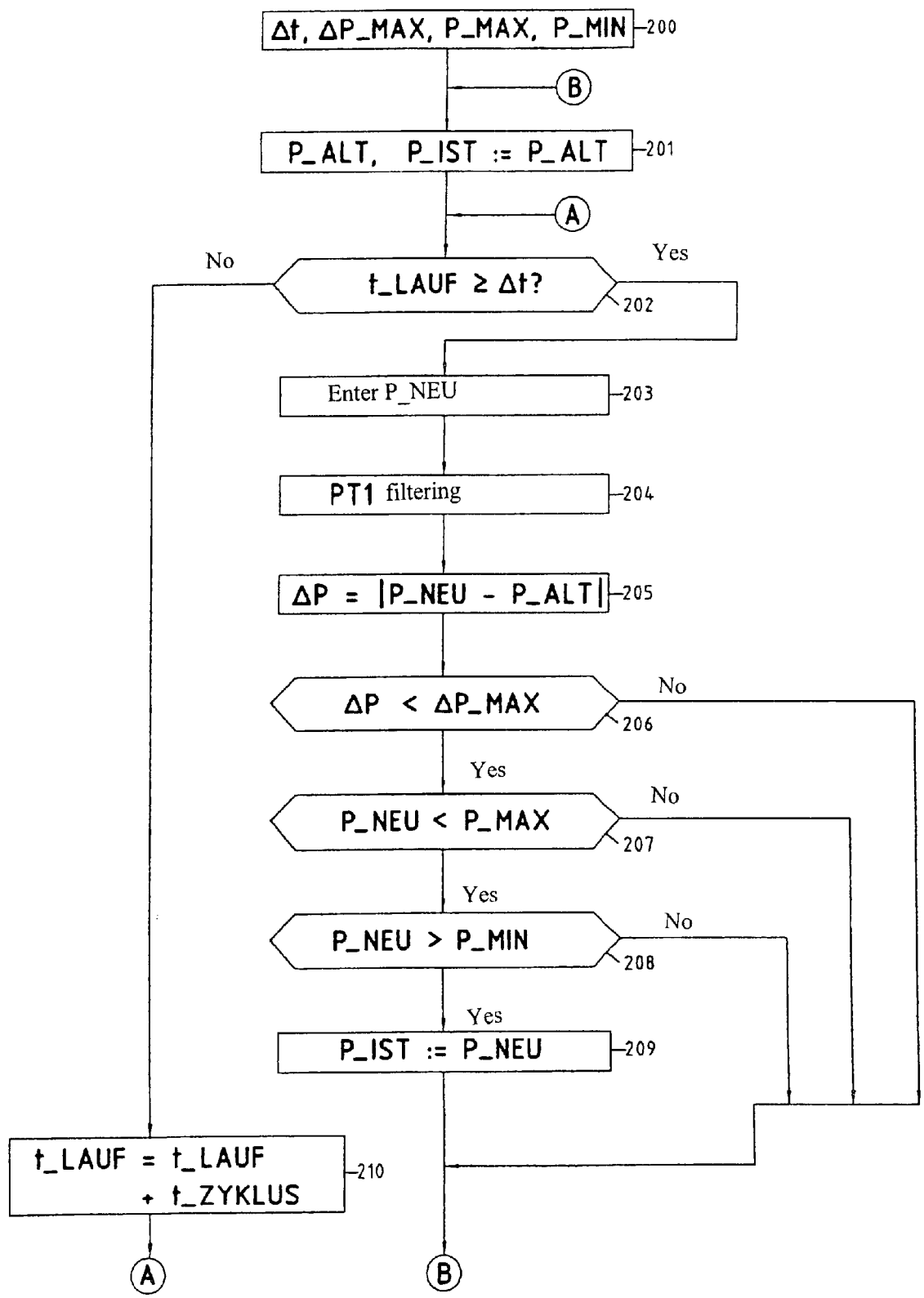
FIG. 2 shows a flow chart for determining an actual value for the brake pressure using tire sensors.

FIG. 2 shows the determination of the actual value for the brake pressure using tire sensors 10, 11, 12, 13. In a first step 200, which is carried out once at the program start, e.g., when the ignition key is operated, the quantities contained in it are pre-initialized. This means that applied values, i.e., invariable values in the normal case, are assigned to these quantities. A threshold value Δt for an interval of time can be pre-initialized at 20 ms or 40 ms, for example. For example, the value±100 bar/s can be assigned to a maximum rate of pressure change ΔP_MAX representing the maximum allowed pressure difference between two pressure quantities determined at successive times.

In a step 201, a value is assigned to quantity P_ALT as follows. The first time the sequence of steps illustrated in FIG. 2 is run through, quantity P_ALT is assigned a value of 0, for example. This means that there is a certain starting state which usually begins at 0 bar and at which no valve controls are necessary. In the case of the subsequent runs, quantity P_ALT is assigned the value of quantity P_IST which prevailed in the previous time cycle or time increment. In addition, in step 201 the value of quantity P_ALT is assigned to quantity P_IST.

Figure 3:
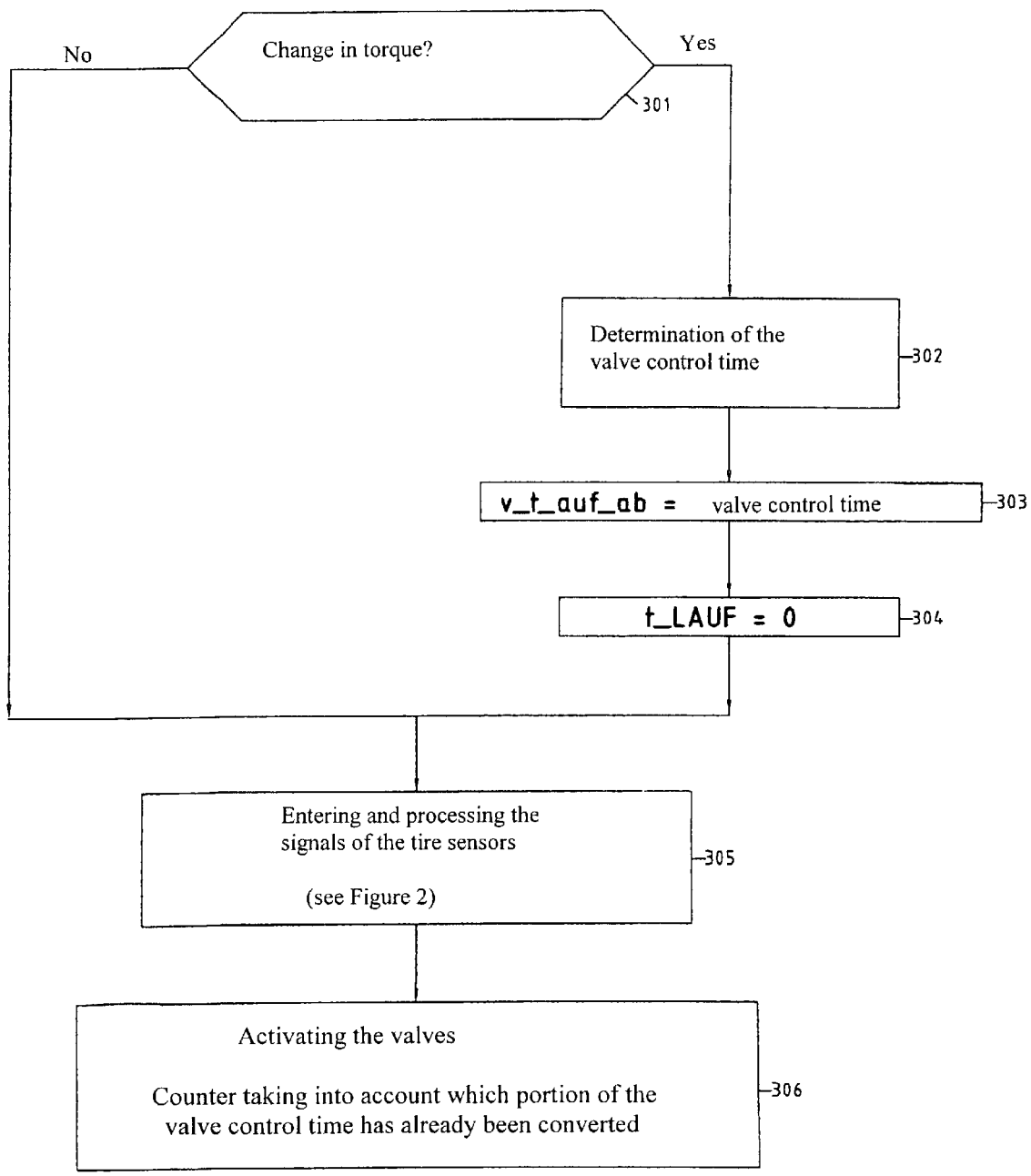
FIG. 3 shows a flow chart for controlling valves.

As explained later in conjunction with FIG. 3, quantity P_IST is used by the valve control.

In a step 202, a running variable t_LAUF is compared with threshold value Δt. If running variable t_LAUF is smaller than threshold value Δt, a step 210 is carried out, where running variable t_LAUF is incremented by a defined value t_ZYKLUS. Then following step 210, step 202 is carried out again. As long as running variable t_LAUF is smaller than threshold value Δt, the value of quantity P_IST remains the same. Only if the value of running variable t_LAUF is larger than threshold value Δt, is a step 203 carried out following step 202, initiating the determination of a new actual value of the pressure quantity.

This procedure yields the following function for running variable t_LAUF. Running variable t_LAUF "controls" the input of new values of quantity P_IST. This ensures that certain valve and hydraulic dead times are bridged due to volume intake in the hydraulic system, transmission of the sensor signals, etc., before processing of the new values is begun or before they are tested for plausibility.

Step 202 is followed by steps 203 to 209. In step 203, a pressure P_NEU that has just been determined is entered. After PT1 filtering of pressure P_NEU input in step 204, the absolute value of a difference ΔP between the pressure P_NEU just entered and the value P_ALT detected previously is formed. This differential value ΔP is compared in step 206 with the maximum rate of pressure change ΔP_MAX, and if the differential value ΔP is greater than the maximum rate of pressure change ΔP_MAX, the processing jumps back to step 201. However, if the differential value ΔP is less than the maximum rate of pressure change ΔP_MAX, it is decided that the rate of change is plausible, and the newly detected pressure P_NEU is processed further. In steps 207 and 208, a check of the newly detected pressure P_NEU is performed to determine whether it is within the allowed physical limits as defined by the values P_MAX and P_MIN. If the newly detected pressure P_NEU is not within the allowed physical limits, processing jumps back to step 201. However, if the newly detected pressure P_NEU is within the allowed physical limits, it is processed further in step 209 so that it is to be used as the new actual value for the valve control. Through the respective jumps back to step 201 in steps 206 or 207 or 208, it is ensured that the old value for the actual pressure is retained and the valve will continue to be controlled using this value. A subsequent valve control using the actual value thus determined is explained below in conjunction with FIG. 3.

The use of a detected pressure value P_NEU as described here instead of an estimated pressure value for an actual value P_IST also replaces the complicated hydraulic models that were used in the past for determining and calculating the valve control time. The valve opening time or valve control time can be determined relatively easily and accurately as described below on the basis of the change in setpoint pressure in the algorithm part. A first characteristic curve for the relationship between pressure and volume and a second characteristic curve for the relationship between the volume required and the time required for it are stored in the algorithm part, with influences such as the throttle diameter of the valves, the pump motor control and the type of hydraulic control being taken into account in the characteristic curves in general. If there is to be a change in pressure from a P_SOLL_ALT of 20 bar, for example, to P_SOLL_NEU of 30 bar, for example, this corresponds to a pressure change ΔP of 10 bar. Knowing the exact value for the brake pressure from the method described above, the corner values for a change in volume can be determined from the first characteristic curve and then the required valve control time can be determined from the second characteristic curve. For a pressure reduction, a similar procedure can be followed, taking into account a modified second characteristic curve.

A process sequence for controlling valves is now described in greater detail with reference to FIG. 3.

A check is performed in step 301 to determine whether a change in torque on at least one wheel of the vehicle is desirable on the basis of the algorithm executed in the control unit, forming the basis for the brake system having traction control. If no change in torque is to be implemented, a step 305 is carried out. However, if a change in torque is to be implemented, a step 302 is carried out. Since a change in torque to be implemented on a wheel is associated with an increase or reduction in pressure, the valve control time required for the respective wheel in this connection is determined in step 302. This determination is performed as a function of the change in pressure ΔP required to implement the change in torque starting from the actual pressure P_IST as the prevailing pressure level using a P-V characteristic curve. In the case of a hydraulic brake system, this characteristic curve shows the relationship between the volume of brake medium to be supplied and the volume to be drained out to implement a certain brake pressure. Thus, in step 302 the valve control time for implementing the change in torque is determined by determining the valve control time required to convert the setpoint pressure to be established on the basis of the change in torque. In step 303, the valve control time is assigned to variable v_t_auf_ab. In step 304, the running variable t_LAUF already described in conjunction with FIG. 2 is initialized.

In a step 305, the signals of the tire sensors are entered and processed according to the procedure illustrated in FIG. 2, i.e., the prevailing actual pressure is made available. The actual control of the valves takes place in a subsequent step 306. As part of this control, the setpoint pressure determined by the control unit is compared with the actual pressure established for the individual wheels. This means that a check is performed to determine whether the actual pressure resulting on the basis of the valve control is plausible for the setpoint pressure required by the control unit. If this is not the case, i.e., if there is a leak or if one of the valves is jammed, the valve control is modified so that this error is eliminated. In this connection, a counter is used, taking into account which portion of the required valve control time has already been used up by controlling the valves.

Figure 4:
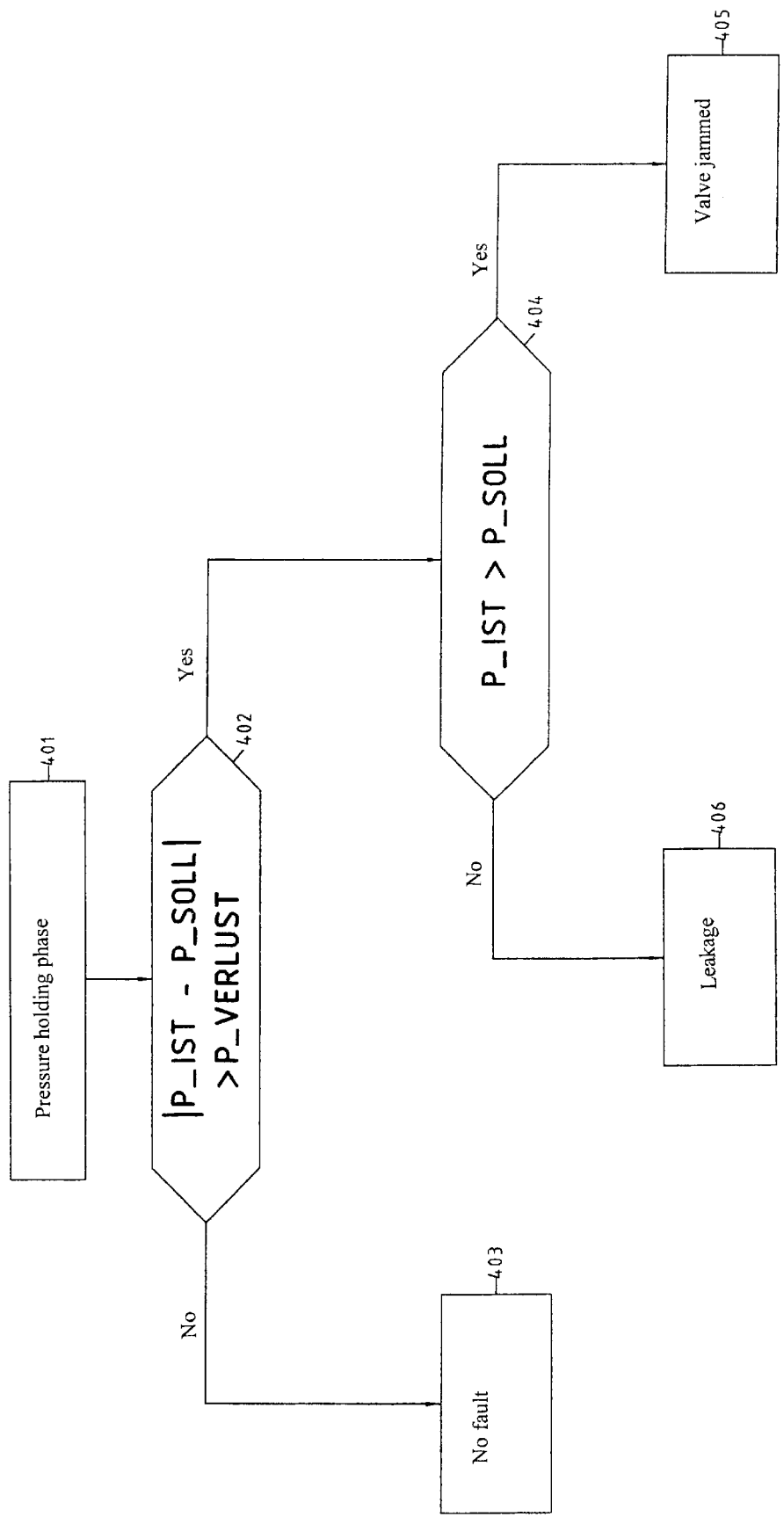
FIG. 4 shows a flow chart for detecting a hydraulic leak or a jammed valve.

As another example, the exact value determined for the brake pressure is used to detect a hydraulic leak as well as a leaky cutoff valve, as illustrated in the flow chart in FIG. 4.

A check for a hydraulic leak and/or a leaky cutoff valve is performed during a pressure holding phase of the valve control by comparing the actual pressure P_IST with the setpoint pressure P_SOLL in each control cycle. In the case of the traditional pulse-pause controllers, the status of a pressure holding phase is displayed by a pause flag. In the case of controller types with a predetermined setpoint, this status is recognized when the setpoint quantity does not change within a predetermined period of time. In the pressure holding phases, the setpoint pressure request P_SOLL of the controller and the detected brake pressure as the actual pressure P_IST in the ideal case are identical or have a very small absolute difference resulting from a hysteresis determined by the valve logic. The value for the absolute difference is preset as a predefined pressure value P_VERLUST. If in a comparison of the actual pressure P_IST with the setpoint pressure P_SOLL, the difference between the actual pressure P_IST and the setpoint pressure P_SOLL is greater than the predefined pressure value P_VERLUST, the conclusion can be drawn that a hydraulic leak in a corresponding valve or jamming of a valve exists. For example, the period of time for detecting the pressure holding phase is 100 ms, and the value for the predetermined pressure value P_VERLUST is 5 bar. It is possible to detect both a slow leak and a sudden leak as a sudden pressure drop on a vehicle wheel.

According to FIG. 4, the determination of whether there is an fault is performed in step 401 during a pressure holding phase. A query in step 402 determines whether there is a fault in the brake system. If there is no fault, the actual value P_IST of the brake pressure is established by taking into account small tolerances which are defined by the threshold value P_VERLUST, according to the setpoint value P_SOLL. Thus, a deviation between the setpoint and actual value is a sign of a fault.

If the deviation is less than the threshold value, i.e., if the deviation is within the tolerance defined by the threshold value, there is no fault and processing jumps to step 403, because no corrective measures are desirable in this case. However, there is a fault if the control deviation is greater than the threshold value. To be able to determine which type of fault is involved, a second query is performed in step 404 to determine whether the actual value is greater than the setpoint. If the actual value is greater than the setpoint, then there is a greater brake pressure in the wheel operating cylinder than should be the case on the basis of the setpoint. This means that the intake valve assigned to this wheel operating cylinder, for example, is jammed, which is why volume can flow back into the wheel brake cylinder. In this case, a step 405 is carried out, where the valves (intake valve and discharge valve) assigned to the wheel brake cylinder and possibly the valves (intake valve and reversing valve) assigned to the brake circuit are controlled so that the excess brake pressure in this wheel brake cylinder is reduced. However, if the actual pressure is lower than the setpoint, then the brake pressure prevailing in the wheel brake cylinder is lower than it should be on the basis of the setpoint. There is either a leak in a valve assigned to the wheel brake cylinder or there is a leak in an inlet line, so that volume can flow out of the wheel brake cylinder. In this case, a step 406 is carried out, where a valve control is performed so that the brake pressure in the wheel brake cylinder is built up.

To ensure the detection of a leak, additional signals such as the absolute slip difference, a control deviation or a wheel acceleration can be analyzed. This takes place by comparing the wheel acceleration with a positive value and by checking the difference between the speed of the driving wheel and the non-driven wheel for an increase, because the speed of the wheel increases in the case of a leak due to the dropping pressure in the wheel brake cylinder. The conditions with which the leakage detection can be linked are given below in a compact form.

(A_VAN>2 g)^(VAN-VNA)>((old slip difference on entering the holding phase)+#SCHL_OFF)^
(RA>((old control deviation on entering the holding phase)+ #RA_OFF)

Where the following definitions hold:

A_VAN: wheel acceleration
VAN: driving wheel speed
VNA: non-driven speed
RA: control deviation

SCH_OFF: slip offset, 10 km/h
RA_OFF: control deviation offset, 5 km/h

In a similar manner to that described above for the case of a leak, the quantities indicated above may also be used in conjunction with detection of a jammed valve. However, in this case a check for negative acceleration or a declining speed difference is desirable, because in this case there is an increase in pressure and thus a reduction in wheel speed.

As an alternative to the illustration in FIG. 4, to determine whether there is a leak or a jammed valve, the absolute value of the deviation between the actual value and the setpoint can be analyzed. However, in this case, the wheel acceleration is also analyzed. In the case of positive wheel acceleration, there is a leak, or in the case of negative wheel acceleration there is a jammed valve. Furthermore, it is also conceivable as another alternative to use different threshold values for detection of a leak or a jammed valve.

Due to the determination of pressure quantities according to the present invention, countermeasures can be initiated immediately on detection of a hydraulic leak or a jammed valve, so that disadvantages resulting from a pressure drop or an increased pressure can be compensated, and the driver of the vehicle perceives little or no impairment of function. In addition to an increase or decrease in pressure after detecting a leak or a jammed valve, the pressure holding phases can be shortened or the pulse control times can be lengthened.

A method and a system for operating a brake system of a motor vehicle having traction control are described, where many advantages are achieved through the determination of pressure quantities according to the present invention. In particular, it is described how the pressure quantities thus determined are used in a control unit for further control/regulation and valve control. Due to the accurate determination of pressure quantities, it is possible to design a system for operating brake systems more easily and more efficiently than in the past.

The present invention is described above on the basis of embodiments which are based on an electrohydraulic brake system. However, the object of the present invention can also be used with a hydraulic brake system, a pneumatic brake system or an electropneumatic brake system.

What is claimed is:

1. A method for operating a brake system of a motor vehicle including a traction control, comprising:
   assigning sensors of the brake system to individual vehicle wheels;
   causing each of the sensors to detect a quantity representing at least one of a driving force and a braking force acting between a road surface and a respective one of the vehicle wheels;
   determining pressure quantities representing a prevailing brake pressure for the respective one of the vehicle wheels as a function of the quantities detected with the sensors; and
   analyzing the determined pressure quantities for an operation of the brake system including the traction control.

2. A method for operating a brake system of a motor vehicle including a traction control, comprising the steps of:
   assigning sensors of the brake system to individual vehicle wheels;
   causing each of the sensors to detect a quantity representing at least one of a driving force and a braking force acting between a road surface and a respective one of the vehicle wheels;
   analyzing pressure quantities representing a brake pressure established for the respective one of the vehicle wheels for an operation of the brake system including the traction control;
   determining the pressure quantities as a function of the quantities detected with the sensors; and wherein:
   the quantities detected by the sensors each results from at least one of a movement and a rotation of the respective one of the vehicle wheels, and wherein the method further comprising the step of:
   causing the sensors to output the quantities as one of phase-modulated signals and amplitude-modulated signals.

3. A method for operating a brake system of a motor vehicle including a traction control, comprising the steps of:
   assigning sensors of the brake system to individual vehicle wheels;
   causing each of the sensors to detect a quantity representing at least one of a driving force and a braking force acting between a road surface and a respective one of the vehicle wheels;
   analyzing pressure quantities representing a brake pressure established for the respective one of the vehicle wheels for an operation of the brake system including the traction control;
   determining the pressure quantities as a function of the quantities detected with the sensors; and further comprising the steps of:
   causing an analyzer unit to determine a quantity describing a circumferential force of the respective one of the vehicle wheels from the quantities detected by the sensors for the vehicle wheels; and determining the brake pressure on the basis of the quantity describing the circumferential force.

4. The method according to claim 1, further comprising:
   providing each of the sensors on the respective one of the vehicle wheels;
   determining each one of the pressure quantities for each one of the vehicle wheel; and
   sending the determined pressure quantities to a control unit for regulating the brake pressure according to the pressure quantities.

5. The method according to claim 3, further comprising at least one of the steps of:
   determining the quantity describing the circumferential force of the respective one of the wheels in accordance with a characteristic curve stored in the analyzer unit as a function of a respective one of a phase modulated signal and an amplitude-modulated signal; and
   determining the brake pressure from the circumferential force by multiplying the circumferential force by a predetermined factor.

6. The method according to claim 1, further comprising:
   sending the determined pressure quantities as actual values directly to a control unit for brakes of the motor vehicle.

7. The method according to claim 6, further comprising:
   processing further the determined pressure quantities sent as the actual values for a given brake pressure for each one of the vehicle wheels in an algorithm in the control unit.

8. The method according to claim 7, further comprising:
   supplying the pressure quantities processed further in the algorithm to control the brake for the given brake pressure for each one of the vehicle wheels as control signals to valve controls for the brakes for each one of the vehicle wheels.

9. A method for operating a brake system of a motor vehicle including a traction control, comprising the steps of:

assigning sensors of the brake system to individual vehicle wheels;

causing each of the sensors to detect a quantity representing at least one of a driving force and a braking force acting between a road surface and a respective one of the vehicle wheels;

analyzing pressure quantities representing a brake pressure established for the respective one of the vehicle wheels for an operation of the brake system including the traction control;

determining the pressure quantities as a function of the quantities detected with the sensors;

sending the pressure quantities as actual values directly to a control unit for brakes of the motor vehicle; and further comprising the steps of:

subjecting newly determined ones of the pressure quantities for a given brake pressure for each one of the vehicle wheels to a PT1 filtering after being entered into the control unit;

performing a check to determine whether a predetermined rate of a pressure change representing a maximum allowed pressure difference between two of the pressure quantities determined at successive times is exceeded and whether the detected quantities are within predetermined pressure limits; and when conditions are met, sending the newly determined pressure quantities as the actual values to valve controls.

10. The method according to claim 9, further comprising the step of:

determining new values for the actual values only after a predetermined period of time has elapsed.

11. The method according to claim 9, further comprising the steps of:

during a pressure holding phase of the valve controls, comparing the pressure quantities determined as the actual values for the given brake pressure for each one of the vehicle wheels with setpoints for the given brake pressure; and if a deviation is greater than a predetermined value, determining that one of a hydraulic leak and a jammed valve has occurred.

12. The method according to claim 11, further comprising the steps of:

causing the control unit and the valve control to immediately initiate a pressure buildup on detection of the hydraulic leak; and immediately initiating a pressure reduction on detection of the jammed valve.

13. A system, comprising:

a control unit; and a processing unit arranged in the control unit, the processing unit;

entering pressure quantities determined for a prevailing brake pressure, subjecting the pressure quantities thus entered to a PT1 filtering, checking whether a predetermined rate of pressure change representing a maximum allowed pressure difference between two of the pressure quantities determined at successive times is exceeded and whether the pressure quantities are within predetermined pressure limits, and when conditions are met, sending newly determined ones of the pressure quantities as actual values to a valve control.

14. The system according to claim 13, wherein:

the processing unit includes a timer for defining a predetermined period of time after which the processing unit determines new values for the actual values.

15. The system according to claim 13, wherein:

the processing unit compares the pressure quantities for a respective brake pressure for each individual vehicle wheel determined as the actual values during a pressure holding phase of the valve control with setpoint values for the respective brake pressure, and if a deviation is greater than a predetermined value, a presence of one of a hydraulic leak and a jammed valve is deduced.

16. The system according to claim 15, wherein:

the control unit and the valve control immediately initiate a pressure buildup when the hydraulic leak is detected and immediately initiate a reduction in pressure when the jammed valve is detected.

* * * * *